(12) United States Patent
Seferin et al.

(10) Patent No.: US 8,735,480 B2
(45) Date of Patent: May 27, 2014

(54) ADHESIVE COMPOSITION FOR TYRES, METHOD FOR PRODUCING THIS COMPOSITION AND METHOD FOR GLUEING TYRES USING THIS COMPOSITION

(75) Inventors: Marcus Seferin, Porto Alegre (BR); Tiago Accorsi, Nova Prata (BR)

(73) Assignees: Uniao Brasileira de Educacao e Assistencia—Mantenedora da PUCRS, Porto Alegre (BR); Rafael Stein Comercio de Sucos Ltda/ME, Cidade de Montenegro (BR)

( * ) Notice: Subject to any disclaimer, the term of this patent is extended or adjusted under 35 U.S.C. 154(b) by 11 days.

(21) Appl. No.: 13/520,184

(22) PCT Filed: Dec. 29, 2010

(86) PCT No.: PCT/BR2010/000436
§ 371 (c)(1),
(2), (4) Date: Aug. 26, 2012

(87) PCT Pub. No.: WO2011/079365
PCT Pub. Date: Jul. 7, 2011

(65) Prior Publication Data
US 2012/0312454 A1    Dec. 13, 2012

(30) Foreign Application Priority Data
Dec. 30, 2009 (BR) .................................. 0905239

(51) Int. Cl.
| | |
|---|---|
| *C08K 5/00* | (2006.01) |
| *C08K 5/05* | (2006.01) |
| *C08K 5/06* | (2006.01) |
| *C09B 67/00* | (2006.01) |
| *C08K 3/00* | (2006.01) |
| *B29D 30/00* | (2006.01) |
| *B05D 5/10* | (2006.01) |
| *B01F 1/00* | (2006.01) |

(52) U.S. Cl.
USPC ........... 524/399; 524/502; 524/383; 524/378; 524/575.5; 156/123; 427/207.1; 252/364

(58) Field of Classification Search
USPC ...................... 524/399, 502, 383, 378, 575.5; 156/123; 427/207.1; 252/364
See application file for complete search history.

(56) References Cited

U.S. PATENT DOCUMENTS

| | | | |
|---|---|---|---|
| 5,362,316 A | 11/1994 | Paradise | |
| 2001/0034386 A1 | 10/2001 | Scheibelhoffer | |
| 2003/0027904 A1 | 2/2003 | Cordova | |
| 2003/0065080 A1 | 4/2003 | Sneddon | |
| 2004/0109853 A1* | 6/2004 | McDaniel | 424/94.6 |
| 2009/0074844 A1* | 3/2009 | Nishiura et al. | 424/449 |

FOREIGN PATENT DOCUMENTS

| | | |
|---|---|---|
| JP | 2008201994 A | 9/2008 |
| WO | 9735914 A1 | 10/1997 |
| WO | 2008129689 A1 | 10/2008 |

OTHER PUBLICATIONS

Handbook of Adhesives and Sealants, Edito por Edward M. Petrie, McGraw-Hill Companies, Inc., 2000, cap. 6 e 9, ISBN 0-07-049888-1.

* cited by examiner

*Primary Examiner* — William Cheung
(74) *Attorney, Agent, or Firm* — Laurence P. Colton; Smith Risley Tempel Santos LLC

(57) ABSTRACT

This invention provides a natural solvent-based adhesive composition for tires; a mix to prepare adhesive compositions; a preactivation compound for tires; processes to obtain said compositions or mix; or the use of said compounds in bonding tires; and bonding and preactivation processes for tires. The objects of the invention provide industrial solutions that, while introducing a considerable reduction in environmental impact in their preparation and use, provide better health conditions for the professionals who work in the tire bonding industry.

13 Claims, No Drawings

ADHESIVE COMPOSITION FOR TYRES, METHOD FOR PRODUCING THIS COMPOSITION AND METHOD FOR GLUEING TYRES USING THIS COMPOSITION

This application is a U.S. National Stage Patent Application under 35 U.S.C. 371 of PCT International Patent Application Ser. No. PCT/BR10/00436 filed on Dec. 29, 2010, which in turn claims priority to Brazil Patent Application No. P10905239-9 filed Dec. 30, 2009. The contents of which are all incorporated by reference herein its entirety.

FIELD OF THE INVENTION

The present invention falls within the field of Engineering and Chemistry, in the sector of tire adhesives. More specifically, this invention provides a natural solvent-based adhesive composition for tires; a mix to prepare adhesive compositions; a preactivation compound for tires; processes to obtain said compositions or mix; or the use of said compounds in bonding tires; and bonding and preactivation processes for tires. The objects of the invention provide industrial solutions which, while introducing a considerable reduction in environmental impact in their preparation and use, provide better health conditions for the professionals who work in the tire bonding industry.

BACKGROUND OF THE INVENTION

Vulcanized adhesives are materials which are widely used to solidify the union between the parts which may be vulcanized rubber, vulcanized rubber with others which are not vulcanized, as well as rubber which may be vulcanized or not with other materials.

Traditionally, these adhesives contain elastomers such as natural rubber, styrene-butadiene copolymers, polychloroprene or similar polymers and additives to promote vulcanization, thickeners, and fillers, among others, that are mixed during the solid phases and then dissolved using solvents.

The solvents usually employed are mixtures comprising aromatic and aliphatic hydrocarbons, considered highly toxic, so they are replaced by other solvents, which cause less impact to the environment and human health and which has been a major inducement for research.

Substitution of aromatic and aliphatic solvents by natural solvents consisting of citrus terpenes and/or other natural terpenes such as d-limonene, terpinolenes, myrcene and linalool can be an alternative for the production of adhesives with a low toxicity. Moreover, these solvents are obtained from renewable sources and as co-products from the processes to extract juice for human consumption.

Within the scope of patents, some documents describe natural solvent based adhesive compositions and their use in methods for tire bonding.

Document U.S. 2003/0065080 describes resin coatings, adhesives and adhesive compositions comprising styrene copolymers and a terpene as a solvent and which are used for the manufacture of toys. This invention differs from that document because, among other technical reasons, it does not comprise styrene copolymers and it will not be used to manufacture toys, but tires.

Document U.S. Pat. No. 5,863,987 describes an adhesive composition used to manufacture tires comprising co-polymers of pyridine-styrene-butadiene, particles of latex and thermoset resin. This invention differs from that document because, among other technical reasons, it does not comprise copolymers of pyridine-styrene-butadiene and thermoset resin, and because it comprises natural solvents, a fact that is not mentioned in said document.

Document U.S. Pat. No. 6,136,123 describes an adhesive composition used to manufacture tires comprising a co-polymer of an acrylic acid ester and an organic peroxide. This invention differs from that document because, among other technical reasons, it does not comprise copolymers of an acrylic acid ester and an organic peroxide, and because it comprises natural solvents, a fact that is not mentioned in said document.

Document U.S. Pat. No. 4,497,927 describes an adhesive compound for the manufacture of tires comprising an oil-in-water emulsion with a continuous oily phase, in which a vulcanizable rubber compound is dissolved. This invention differs from that document because, among other technical reasons, it does not comprise an oil-in-water emulsion and because it comprises natural solvents, a fact that is not mentioned in said document.

What is clear from the literature researched, is that no prior documents were found suggesting the disclosures of this invention, so that the solution proposed herein, in the view of the inventors, is novel and has an inventive step in comparison with the prior art.

SUMMARY OF THE INVENTION

The various objects of the invention have as a common inventive step the use of a different approach with regard to the solvents traditionally employed in the adhesives utilized in the tire industry and tire retreading processes. The core of the invention is to develop an innovative adhesive composition based on natural solvents, which eliminates the technical problems arising from the use of traditional solvents—which are problematic to the environment and human health. The invention therefore, provide industrial solutions which, while introducing a considerable reduction in environmental impact in their preparation and use, provide better health conditions for the professionals who work in the tire sector.

One of the objects of the invention is a natural solvent-based adhesive composition for tires. In one preferred embodiment, said composition comprises:
  a) adhesive components selected from: elastomers; tackifying agents; metal salts of higher fatty acids; vulcanizing agents; vulcanizing accelerators free of nitrosamine precursors which are toxic to human health; antioxidants; plasticizers; viscosity control agents; antiozonants; as well as combinations thereof;
  b) natural solvents chosen from among terpenes; and
  c) co-solvents,
where the quantity of the co-solvent is from 5% to 45% of the quantity of the natural solvent.

Another of the objects of the invention is a mix to prepare adhesive compositions. In one preferred embodiment, the mix of the invention comprises:
  a) resins, stabilizers and antioxidants; and
  b) natural solvents chosen from among terpenes, preferably solvents that are predominantly formed of citrus terpenes and/or other natural terpenes, more specifically, d-limonene, terpinolenes, myrcene, linalool l-limonene and their racemic mixture.

Optionally, said mix further comprises co-solvents selected from among non-polar solvents that are compatible with terpene solvents, preferably compounds such as dimethyl ether, where the quantity of co-solvent is between 5% and 45% of the quantity of the natural solvent.

Another of the objects of the invention is a process to obtain the mix to prepare tire adhesives. In one preferred embodiment, said process comprises mixing resins, stabilizers and antioxidants with natural solvents chosen from among terpenes, preferably solvents that are predominantly formed of citrus terpenes and/or other natural terpenes, more specifically, d-limonene, terpinolenes, myrcene, linalool l-limonene and their racemic mixture. Optionally, said process further comprises a mixing stage of the aforementioned material with co-solvents selected from among non-polar solvents which are compatible with terpene solvents, preferably compounds such as dimethyl ether, where the quantity of the co-solvent is from 5% to 45% of the quantity of the natural solvent.

Another of the objects of the invention is a process to obtain the an adhesive composition for tires. In one preferred embodiment, said process comprises:
a) preparing a mixture of solids comprising: hydrocarbon and terpene resins, resinifiable esters rich in styrene, indene and methyl derivatives, more preferably from petroleum hydrocarbon resins, tackifying resins, in addition to stabilizers, surfactants, antioxidants, or combinations thereof; and
b) adding the mix of the invention, in a quantity that may range from 1% to 49% of the total solid mass above.

Another of the objects of the invention is a preactivation composition for tires. In one preferred embodiment, a preactivation composition of the invention comprises solvent components selected from the terpene group, among these limonene and terpinolene and solvents from the alcohol group.

Another of the objects of the invention is the use of said compositions or the mix in bonding processes for tires. Another of the objects of the invention is a bonding process or preactivation for tires. In one preferred embodiment, the process of bonding of tires comprises the stages of:
a) application, to a first part of a tire to which one wishes, of an adhesive composition comprising:
  i) adhesive components selected from among elastomers, tackifying agents, metal salts of higher fatty acids, vulcanizing agents, vulcanizing accelerators, vulcanizing accelerators free of nitrosamine precursors which are toxic to human health, antioxidants, plasticizers, viscosity control agents, antiozonants and combinations thereof;
  ii) natural solvents chosen from among terpenes; and
  iii) co-solvents,
where the quantity of the co-solvent is from 5% to 45% of the quantity of the natural solvent, in at least one of the substrates to be joined; and
b) union of another part of the tire to be joined to the first part.

These and other objects of the invention shall be immediately appraised by those well versed in the art and by companies with interests in the tire sector, and will be described in detail sufficient for its reproduction, in the following description.

DETAILED DESCRIPTION OF THE INVENTION

The various objects of the invention have as a common inventive step the use of a different approach with regard to the solvents traditionally employed in the adhesives utilized in the tire industry and tire retreading processes. The invention and its various objects are based on the use of vulcanizing adhesives for tires formulated based on nontoxic solvents containing citrus terpenes from renewable sources and vulcanization than that do not generate nitrosamines which are toxic to human health. Although the low volatility of terpenes such as limonene and the like can be an impediment to its use in contact adhesives, vulcanizing adhesives for tires can do without this feature, per its application methodology. Furthermore, terpenes such as limonene have thermodynamic compatibility with the polymeric materials used in the formulation of this type of adhesives in a manner similar to naphthenic solvents.

The invention developed deals with, among other objects, an adhesive for tires classified as a vulcanizing adhesive, based on natural, non-toxic solvents (d-limonene, terpinolenes, myrcene, linalool, etc.), and that use in its composition, natural rubber and vulcanizing accelerators which do not generate toxic nitrosamines after application. Because a solvent system from a renewable source is used and obtained as a byproduct of processes for the extraction of juice for human consumption and natural resins, this adhesive in comparison with others offers a great advantage in that it has low toxicity and has no narcotic effects, unlike aromatic hydrocarbons (such as toluene, for example) in addition to not harming the environment during its production stages nor in its application. Adding to these facts the possibility of offering the consumer a product with a cost similar to conventional products, that is able to offer a product developed based on environmental and economic sustainability, adding value to a juice industry co-product that has as its principal purpose to honor and maintain the health of the end user.

The examples shown are intended only to illustrate one of many ways to carry out the invention but without limiting the scope thereof.

Pre-Activator

A preactivation compound for tires of this invention comprises solvent components selected from the terpene group, among these limonene and terpinolene and solvents from the alcohol group.

Pre-Activation Process

The pre-activation to which this invention refers is described as a process to prepare the elastomer before receiving the adhesive to ultimately join the parts. Preferably, the terpene solvent base is limonene (d- and l-). The pre-activator reacts with the rubber activating the surface layer so that the connections between the surface of the rubber, the adhesive mixture and the other surface to be joined (which may be of rubber, canvas cloth, etc.) will be stronger, making the union between the parts more cohesive and stable.

The pre-activation process comprises the step of spreading the product on at least one substrate.

Adhesive Composition for Tires

The adhesive composition for tires of this invention comprises:
a) adhesive components selected from among elastomers, tackifying agents; metal salts of higher fatty acids, vulcanizing agents, vulcanizing accelerators, vulcanizing accelerators free of nitrosamine precursors which are toxic to human health, antioxidants, plasticizers, viscosity control agents, antiozonants and combinations thereof;
b) natural solvents chosen from among terpenes; and
c) co-solvents,
where the quantity of the co-solvent is from 5% to 45% of the quantity of the natural solvent.

Adhesive Components

The adhesive components of this invention comprise any components which provide an adhesive nature to the composition, being selected from the group comprising: elastomers, tackifying agents, smoothing agents, vulcanizing agents, vulcanizing accelerators, antioxidants, plasticizers, viscosity control agents, and antiozonants. In a preferred embodiment natural rubber type RSS-1 in the range of 100 Phr, which are resinifiable and rich in styrene, indene and methyl derivatives, more preferably from petroleum hydrocarbon resins within the range of 15-60 Phr, zinc stearate (ZnSt) within the range of 1-10 Phr as a smoothing agent, sulfur in the range of 0.5-5 Phr as a vulcanizing agent and tetramethylthiuram disulfide (TMTD) in the range of 0.5-5 Phr as a vulcanizing accelerator, organic polysulfides in the range of 0.5-5 Phr as a vulcanizing accelerator free of nitrosamines.

Natural Solvents

The natural solvents of this invention preferably comprise solvents that are predominantly formed of citrus terpenes and/or other natural terpenes, more specifically, d-limonene, terpinolenes, myrcene, linalool l-limonene and their racemic mixtures.

Co-Solvent Co-solvents suitable for use in this invention are any of those non-polar solvents which are compatible with terpene solvents. These solvents comprise, preferably, compounds such as dimethyl ether and have the function of regulating homogeneity and the open time. The co-solvents are preferably used in an approximate percentage of 5 to 45% in relation to the natural solvent.

Mix of the Invention

In this invention, the adhesive may be further obtained in two separate stages: the first is to produce a solid mass which, preferably, will contain the components necessary to ensure adhesion of the product, called the masterbatch. The second consists of obtaining a product capable of dispersing this masterbatch, which shall consist of a mixture of resins, stabilizers and antioxidants dispersed in the above described solvent mixtures, in a quantity that may range from 1% to 49% of the total solid mass of this second product, called the Mix.

As mentioned above, this mix consists of an intermediary product, with its principal characteristic being to ensure dispersibility of the adhesive components which, preferably, constitute the masterbatch. The level of solids will be within the range between 1% and 49% in mass, being preferably constituted of hydrocarbon and terpene resins, resinifiable esters rich in styrene, indene, and methyl derivatives, more preferably from petroleum hydrocarbon resins, tackifying resins, in addition to stabilizers, surfactants, antioxidants, etc.

The process to obtain the mix of the invention for tire adhesives comprises homogenization of resins, stabilizers, and antioxidants with a mixture of natural solvents chosen from among the terpenes, preferably solvents that are predominantly formed of citrus terpenes and/or other natural terpenes, more specifically, d-limonene, terpinolenes, myrcene, linalool l-limonene and their racemic mixtures. Said mix is particularly useful for obtaining an adhesive composition for tires, the process of which comprises:

c) preparing a mixture of solids (masterbatch) comprising: hydrocarbon and terpene resins, resinifiable esters rich in styrene, indene, and methyl derivatives, more preferably from petroleum hydrocarbon resins, tackifying resins, in addition to stabilizers, surfactants, antioxidants, or combinations thereof; and d) adding the mix of the invention, in a quantity that may range from 1% to 49% of the total solid mass above.

Obtaining and using the adhesive composition of the invention in the form of the combination of the masterbatch with the mix of the invention provides various technical advantages. Among these, logistical, operational advantages and advantages for occupational health of the operators may be cited, once the adhesive of the invention is obtained by this strategy, processing time is reduced and product handling is minimized along with its risk to the health of the operators.

Use of the Adhesive Composition of the Invention in Tires

The use of the adhesive composition of this invention comprises the application of the adhesive material between the substrates that one wishes to join. The use of the composition, or of the mix of the present invention in combination with the masterbatch, occurs through a process comprising the stages of:

a) application of an adhesive composition comprising:
  i) adhesive components selected from among elastomers, tackifying agents; metal salts of higher fatty acids, vulcanizing agents, vulcanizing accelerators, vulcanizing accelerators free of nitrosamine precursors which are toxic to human health, antioxidants, plasticizers, viscosity control agents, antiozonants and combinations thereof;
  ii) natural solvents chosen from among terpenes; and
  iii) co-solvents,
where the quantity of the co-solvent is from 5% to 45% of the quantity of the natural solvent; in at least one of the substrates to be glued; and b) union of two substrates to be glued;

In one preferred embodiment the application of the adhesive is made through the process of spreading. The union of one or more substrates of this invention includes joining substrates of different or identical characteristics using an adhesive composition. In a preferred embodiment, tire retreading is a process where it is necessary to join with adhesive two pieces of vulcanized rubber in order to reconstitute the tire itself.

Retreading Process

The processes of retreading tires normally include the stages of:

a) checking tires to determine whether the tire is fit enough to be restored;

b) scraping the tires: scraping out the excess rubber is carried out and the parameters are measured from the tread;

c) reaming: detection of holes and damage to the tire shell;

d) gluing: the tire receives a layer of glue to later be inserted the connection and the cloth;

e) extruder: filling of the holes in the tire shell;

f) covering: application of the cloth in the tire shell;

g) cold vulcanization: assembly and cold vulcanization of the tire; and h) hot vulcanization: assembly and hot vulcanization of the tire.

Open Time

In this invention, the concept of open time is related to the time necessary between the application of the adhesive in the substrate (a) and the union of the substrate (b).

In the process of retreading of the present invention, the gluing step is different from those of conventional processes, because it uses the composition of the invention, preferably obtained from the combination of the masterbatch with the mix of the invention. The process of retreading of the invention provides several technical and environmental advantages, highlighting the use of raw materials that reduce or eliminate toxicity to the operators.

Example 1

Mix, Obtaining and Using it in the Adhesion of Tires

The adhesive of the invention to be obtained through the use of the mix of the invention. A solid mass is prepared which contains the components necessary to ensure adhesion of the product, called the masterbatch. Then the mix is prepared of the invention, able to disperse said masterbatch, and consisting of a mixture of resins, stabilizers, and antioxidants dispersed in the above described solvent mixtures, in a quantity that may range from 1% to 49% of the total solid mass of this second product. In one preferred embodiment, the mix of the invention includes hydrocarbon and terpene resins, resinifiable esters rich in styrene, indene, and methyl derivatives, more preferably from petroleum hydrocarbon resins, tackifying resins, in addition to stabilizers, surfactants, antioxidants.

The adhesive composition of the invention, obtained from the combination of the masterbatch with the mix of the invention, and then used in the tire retreading process described above.

Example 2

Adhesive Composition

Several formulations were tested, varying in composition and proportions between natural and synthetic rubber and additives, as well as the composition and proportions between solvents. Among these, we can illustrate one of the preferred adhesive compositions in Table 1.

TABLE 1

Components of the formulations and the range of the adhesive's composition.

| Components | Range |
|---|---|
| Rubber | 100 Phr |
| Resinifiables rich in styrene, indene and methyl derivatives, | 15-60 Phr |
| ZnSt | 1-10 Phr |
| Sulfur | 0.5-5 Phr |
| Accelerator 1 | 0.5-5 Phr |
| Accelerator 2 | 0.5-5 Phr |
| Antioxidants | n/a |
| Plasticizers | n/a |
| Antiozonants | n/a |

The mixing of these components is preferably made using an open mixer with rollers, this formed mass being dispersed in the solvent preferably using a mixing reactor assisted by a mechanical stirrer. After dispersal, the adhesive is ready to use. The adhesive was tested in an autoclave type of machine with hot air, varying time, temperature, and pressure. Adhesion was accomplished on rubber-like test specimens within a timeframe of 90 min., at 140° C. temperature and 5 bar pressure. The specimens were sent after the adhesion to the testing laboratory to perform a strength test. For this test, 3 formulations were within the range of variation of the components as per the table above plus a specimen with the adhesive used traditionally called the control.

Example 3

Adhesive Composition—Pre-Activator

Several formulations were tested, varying the composition and proportions between the solvents mentioned. Among these, we can illustrate one of the preferred pre-activator compositions in Table 2.

TABLE 2

Components of the formulations and the range of the pre-activator's composition.

| Components | Ranges (%) |
|---|---|
| Limonene | 55-99 |
| Terpinolene | 5-25 |
| Absolute alcohol | 20-40 |

The composition was made by a homogeneous mixture of the components.

Those skilled in the art will appraise the knowledge presented herein and may reproduce the invention in the embodiments described and in other variants falling within the scope of the appended claims.

The invention claimed is:
1. An adhesive composition for tires comprising:
a) at least one elastomer selected from the group consisting of natural rubbers;
b) at least one tackifying selected from the group consisting of petroleum hydrocarbon resins;
c) zinc stearate as a smoothing agent;
d) sulfur as a vulcanizing agent;
e) at least one vulcanizing accelerator free of nitrosamine precursors which are toxic to human health is selected from the group consisting of organic polysulfides;
f) natural solvents selected from the group consisting of citrus terpenes; and
g) dimethyl ether as a co-solvent,
wherein the quantity of the co-solvent is from 5% to 45% of the quantity of the natural solvent.
2. The adhesive composition in accordance with claim 1, wherein the elastomer includes natural rubber of the RSS-1 type.
3. The adhesive composition in accordance with claim 1, wherein the tackifying agent is in the range of 15-60 Phr.
4. The adhesive composition in accordance with claim 1, wherein the zinc stearate is within the range of 1-10 Phr.
5. The adhesive composition in accordance with claim 1, wherein the vulcanizing agent is within the range of 0.5-5 Phr.
6. The adhesive composition in accordance with claim 1, wherein the vulcanizing accelerator free of nitrosamine precursors which are toxic to human health is within the range of 0.5-5 Phr.
7. The adhesive composition in accordance with claim 6, wherein the vulcanizing accelerator is within the range of 0.5-5 Phr.
8. The adhesive composition in accordance with claim 1, wherein the natural solvent is selected from the group consisting of d-limonene, terpinolenes, myrcene, linalool 1-limonene, combinations thereof, and racemic mixtures thereof.
9. The adhesive composition in accordance with claim 1, wherein the co-solvent includes compounds to regulate homogeneity and open time of the adhesive composition.
10. A tire gluing process, comprising:
a) applying to at least one substrate to be joined an adhesive composition comprising:
i) at least one elastomer selected from the group consisting of natural rubbers;
ii) at least one tackifying agent selected from the group consisting of petroleum hydrocarbon resins;
iii) zinc stearate as a smoothing agent;
iv) sulfur as a vulcanizing agent;
v) at least one vulcanizing accelerator selected from the group consisting of organic polysulfides;

vi) natural solvents selected from the group consisting of citrus terpenes; and
vii) dimethyl ether as a co-solvent,
wherein the quantity of the co-solvent is from 5% to 45% of the quantity of the natural solvent; and
b) union of two of the substrates to be joined.

11. The process in accordance with claim 10, wherein a mass formed to be dispersed in the solvent or mixture of solvents is formed using a mixture reactor assisted by a mechanical mixer.

12. The process in accordance with claim 10, further comprising controlling homogeneity and/or open time of the adhesive composition by adjusting the co-solvent.

13. The process in accordance with claim 11, further comprising controlling homogeneity and/or open time of the adhesive composition by adjusting the co-solvent.

* * * * *